Sept. 29, 1936.   E. COWLES   2,055,836
METHOD AND APPARATUS FOR TREATING LIQUIDS
Filed Jan. 18, 1932   2 Sheets—Sheet 1
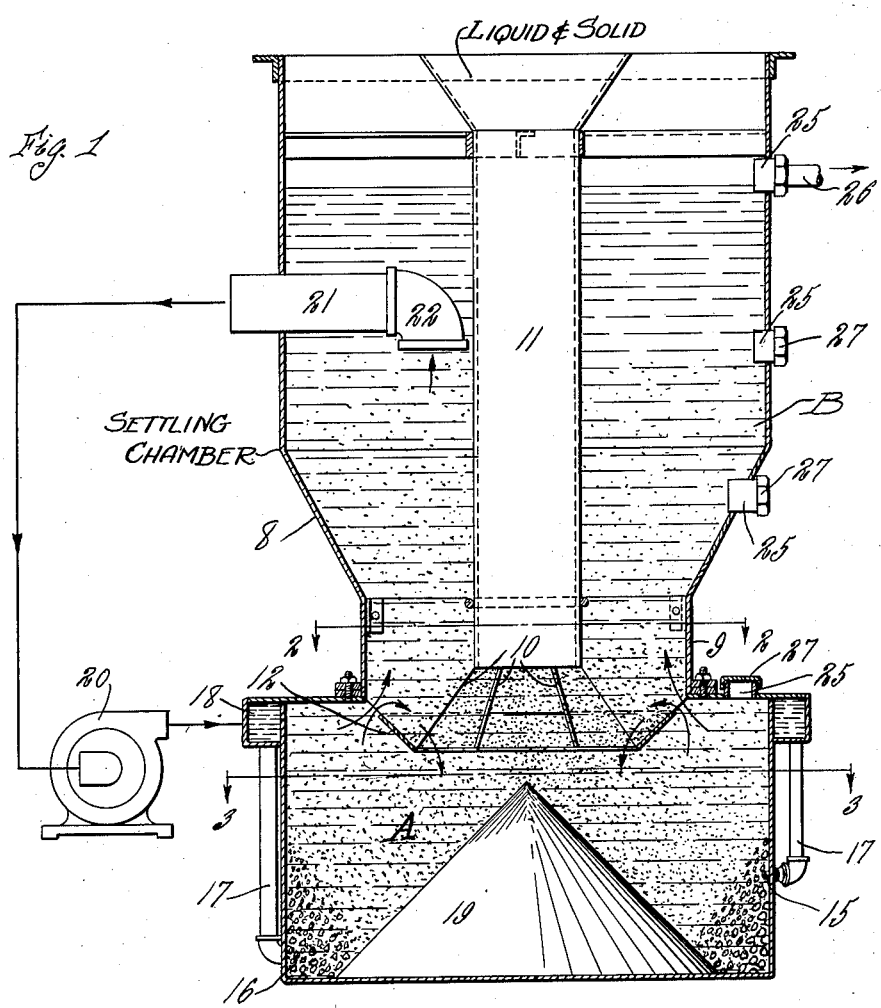

Sept. 29, 1936. E. COWLES 2,055,836
METHOD AND APPARATUS FOR TREATING LIQUIDS
Filed Jan. 18, 1932 2 Sheets-Sheet 2
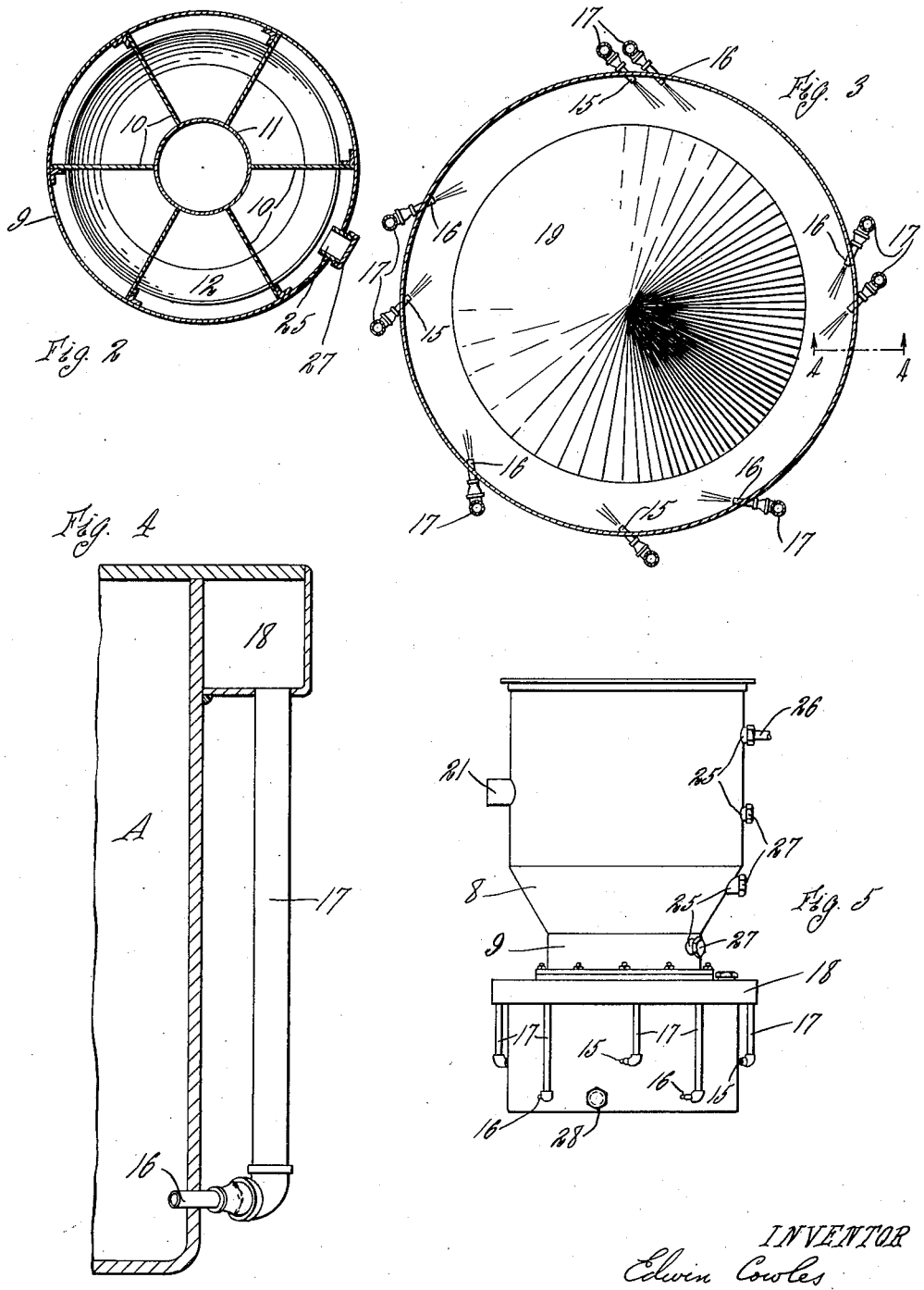

Patented Sept. 29, 1936

2,055,836

UNITED STATES PATENT OFFICE 2,055,836

METHOD AND APPARATUS FOR TREATING LIQUIDS

Edwin Cowles, Princeton, N. J., assignor to The Electric Smelting & Aluminum Company, Sewaren, N. J.

Application January 18, 1932, Serial No. 587,259

20 Claims. (Cl. 23—271)

This invention relates to apparatus for treating liquids with solids for making solutions or suspensions of other material in a liquid, or for otherwise treating liquids by intimately mixing or contacting the liquid with another substance.

The objects of this invention are to provide a method and apparatus of this kind by means of which violent agitation can be produced in one part of an apparatus while in another part of the apparatus, the liquid is substantally undisturbed so that material may be separated by gravity from the liquid; also to provide a method and apparatus of this kind by means of which the treating of the liquid may be carried on continuously; also to provide an apparatus of this kind in which the fully treated liquid may be withdrawn from the apparatus while the same is in operation; also to provide an improved apparatus of this kind by means of which solutions can be made of materials which are difficult to dissolve and which is less subject to wear than apparatus of this kind heretofore made; also to provide a method and apparatus by means of which a part of a column of liquid may be violently agitated for intimately contacting liquid with another material, while the liquid in another part of the column is free from agitation, so that the other material may separate from the liquid in the last mentioned part of the column and return to the first mentioned column; also to improve methods and apparatus of this kind in other respects hereinafter specified.

In the accompanying drawings:

Fig. 1 is a vertical central sectional elevation of a liquid treating apparatus embodying this invention, showing diagrammatically the means for imparting movement to the liquid;

Figs. 2 and 3 are horizontal sections respectively on lines 2—2, and 3—3, Fig. 1;

Fig. 4 is a fragmentary sectional elevation of a portion of the apparatus on line 4—4, Fig. 3, on an enlarged scale;

Fig. 5 is an elevation of the apparatus on a reduced scale.

The liquid treating method and apparatus includes a container for liquid, preferably of a form to contain a body or column of liquid, in a portion of which column the liquid is subjected to agitation, and another portion of which the liquid is comparatively free from agitation, so that material in this latter chamber may separate from the liquid, the two portions of the column being preferably joined in such a manner that the separated material may find its way back to the first mentioned portion of the body of liquid. For example, when the liquid is being treated with a material of higher specific gravity than that of the liquid, the lower portion of the body of liquid forms an agitation chamber and the upper portion thereof a settling chamber, the two portions being separated by means of baffles or the like between which the liquid may flow but which check movement of the liquid in the direction imparted by the agitating means. Consequently, the liquid in the upper portion of the body or column of liquid has very little or no motion, so that heavier material may settle out of this portion of the liquid and find its way back to the agitating chamber. If it is desired to treat liquid with a material of less weight, the relative arrangement of the agitating and separating chambers may be inverted. Other means for returning the material to the agitating chamber may, of course, be employed.

Preferably agitation is provided by introducing into the agitating chamber high velocity jets of liquid, which are preferably introduced into the agitating chamber tangentially, so that a whirling of the liquid in the agitating chamber results. The liquid supplied to the jets is preferably taken from the other chamber which will be hereinafter referred to as the settling chamber. Consequently, there will be a violent movement of the liquid in the agitating chamber caused by the high velocity jets of liquid and a gradual movement of liquid from the agitating chamber into the settling chamber from the upper portion of which the liquid is again withdrawn and forced through the nozzles. The liquid in the upper portion of the settling chamber is, consequently, subjected to practically no movement so that a free settling or separation of undissolved matter in this part of the liquid may take place. When the process is used continuously, liquid may overflow through an outlet in the upper part of the settling chamber above the portion from which liquid is withdrawn by a pump or other means for delivery to the nozzles, whereby substantially clear liquid or a quite stable emulsion is obtained at the overflow without the use of screens and the like.

In this process, the whirling action of the liquid in the agitation chamber will result in the heavier material being thrown outwardly by centrifugal action into the peripheral portions of the agitation chamber in which the jets of liquid can impinge directly against the material. Consequently, gravity and centrifugal action together cause the material to move into positions to be most effectively acted upon by the jets of liquid.

Referring now to the drawings, A in Fig. 1 represents the agitating chamber, and B the settling chamber, the lower portion of which has inclined walls 8 terminating at their lower ends in a neck portion 9 communicating with the top of the agitating chamber A. 10 represents a series of substantially upright radial baffles in the neck portion 9, the inner ends of which preferably terminate in a downwardly extending central passage or chute 11, through which the materials to be treated may be introduced into the apparatus. 12 represents an annular disk or plate spaced at a distance from the wall of the neck portion 9 and secured to the lower ends of the baffles 10, to restrict the flow of liquid upwardly through the neck portion and to materially reduce the extent to which agitation of the liquid in the chamber A can be transmitted to that in the chamber B.

Jets of liquid may be introduced into the agitating chamber A in any suitable or desired manner. In the construction shown, two sets of nozzles 15 and 16 are provided which project into the lower portion of the agitating chamber A through the cylindrical wall thereof. These nozzles may be arranged, as shown, in different elevations above the base of the chamber, and the nozzles are connected by means of pipes or ducts 17 to a manifold 18 which may be secured to the upper portion of the agitating chamber of the apparatus.

19 represents a conical member arranged substantially centrally in the bottom of the agitating chamber A so that any solid material dropping on the same will be deflected outwardly into the portion of the agitating chamber A in which the jets of liquid from the nozzles 15 and 16 act. 20, Fig. 1, represents diagrammatically a pump for supplying liquid to the manifold 18, the pump preferably receiving liquid from a passage 21 extending into the settling chamber B of the apparatus. Preferably, the passage 21 has a downwardly facing receiving opening, formed for example by securing to the inner end of the pipe 21 an elbow 22 so that liquid is drawn upwardly from the settling chamber into the passage 21 for discharge into the manifold 18 and thence to the discharge nozzles 15 and 16.

The apparatus may be provided with any desired number of outlets 25, through which liquid may be drawn off at different levels. In the construction shown, the upper outlet is connected with a discharge pipe 26 while the other outlets are closed by means of caps 27. 28 represents a door or closure for a hand hole or other opening in the lower portion of the agitating chamber for cleaning out or inspection of the same, and for removing any solid material left upon completion of the treatment. If the apparatus is used only for treating soluble material, this opening in the agitation chamber may be omitted.

In the operation of the apparatus, the liquid and other material to be treated is discharged into the central duct or chute 11, the solid material being deflected by the conical member 19 toward the outer portion of the agitating chamber A. When the desired amount of liquid and solid material has been introduced into the apparatus, the pump 20 is started, whereupon the nozzles 15 and 16 will deliver high velocity jets of liquid more or less tangentially into the lower portion of the agitating chamber, which jets of liquid will impinge upon the material in the lower part of the apparatus to act on the same, and furthermore, the liquid will start a whirling or centrifugal action of the liquid in the agitating chamber A, which further increases the action of the liquid on the other material. Since the liquid delivered to the jets is received from the upper portion of the settling chamber, it will be obvious that there will be a gradual flow of liquid upwardly through the neck portion 9 and through the agitating chamber to the inlet 22 of the passage of the receiving pipe 21. The centrifugal or other agitating motion of the liquid in the agitation chamber is not communicated to the liquid in the settling chamber B because of the baffle members 10 and the annular wall 12. Any solid material carried upwardly by this slow flow of the liquid will, consequently, tend to settle in the settling chamber B and in doing so will pass freely between the baffles 10 back into the agitating chamber. When the apparatus is in use, liquid will flow from the agitating chamber A upwardly through the neck, as indicated by the arrows, a portion of the liquid flowing directly upwardly along the outer part of the neck portion, and another part of the liquid flowing downwardly along the upper face of the plate 12, this latter part of the liquid helping to carry material settling out in the separating chamber B back into the agitating chamber. Above the intake opening of the pipe 21, there is very much less movement or flow of liquid, in fact, no movement whatever, unless liquid is withdrawn from the apparatus above this intake opening, and consequently, a very complete separation of liquid and other material takes place in this portion of the settling chamber. If the apparatus is operated continuously, fully treated liquid may be drawn out through the overflow pipe 26 as rapidly as fresh liquid and material is added through the chute 11.

The apparatus and process may be used very effectively in making solutions of materials which are difficult to dissolve, such, for example, as certain alkali metal silicates, and other materials. The apparatus may equally well be used in various leaching operations for making solutions of those parts of the materials which are soluble. In such case, the insoluble portions of the material will accumulate in the agitating chamber and may be removed from time to time. Furthermore, the apparatus can be used for merely treating other materials with liquids, for example, for washing sand to remove clay or other materials which may be carried in suspension through the settling chamber, or for any other purposes where a thorough washing, dissolving or mixing of liquid with another material may be necessary. When the apparatus is used in this manner, liquid with material in suspension may be withdrawn through some of the lower discharge ducts 25.

By the combined use of gravity and centrifugal force, large particles of material will have no tendency to pass out of the agitating chamber, but will adhere closely to the lower portion of the outer wall of the agitating chamber where it is repeatedly subjected to the action of jets of liquid. By using a settling chamber as described, screens, which are subject to wear and replacement and to clogging, are entirely eliminated.

In the apparatus shown, practically only the outer walls of the treating or dissolving chamber A are subjected to wear or abrasion by the material which is being treated, and these walls can be readily replaced or can be provided with a removable lining (not shown).

I claim as my invention:

1. A liquid treating apparatus, including treating and separating chambers, means communicating with said chambers having a passage therein to permit material separating from the liquid in said separating chamber to pass into said treating chamber because of difference in specific gravity between said liquid and said material and through which passage liquid can flow from said treating chamber to said separating chamber, means for subjecting the liquid and material in said treating chamber to violent agitation, and means in said passage for preventing the transmission of whirling motion from said treating to said separating chamber.

2. A liquid treating apparatus, including treating and separating chambers connected to permit material separating from the liquid in said separating chamber to pass into said treating chamber because of difference in specific gravity between said liquid and said material, means for agitating the liquid and material in said treating chamber by subjecting the same to rapid motion, baffles arranged between said chambers and extending transversely of the direction of said motion for preventing the transmission of said motion from said treating to said separating chamber, and means for withdrawing liquid from said separating chamber and for discharging the same into said treating chamber.

3. A liquid treating apparatus, including a treating chamber, means for providing violent agitation in a portion of said treating chamber by subjecting the liquid in said chamber to rapid motion, a settling chamber communicating with another portion of said treating chamber and in which material may settle out of the liquid, means for returning settled material to said treating chamber for further treatment, and means arranged between said chambers for preventing the transmission of said motion from said treating chamber to said settling chamber including a plurality of baffles between which material being treated may pass from one chamber to the other.

4. A liquid treating apparatus, including a treating chamber, means for subjecting liquid in the treating chamber to centrifugal action by tangential jets of liquid, a separating chamber connected with said centrifugal chamber by a reduced neck portion, and substantially upright baffles in said neck portion to prevent transmission of rotary motion of liquid in said treating chamber to the liquid in said separating chamber and to permit other material separating from the liquid in the separating chamber to pass into said treating chamber because of difference in specific gravity of the liquid and other material.

5. In a liquid treating apparatus, the combination of a treating chamber, means for directing jets of liquid substantially tangentially into said treating chamber to produce a whirling movement of liquid in said chamber, a separating chamber connected by a neck with said treating chamber, substantially upright baffles in said neck for preventing the transmission of whirling motion to the liquid in the separating chamber, means for pumping liquid from said separating chamber and for discharging the same into said treating chamber in the form of jets, said two chambers being so located relatively to each other that material separating from the liquid in the separating chamber will pass directly into said treating chamber because of difference in specific gravity between said material and the liquid.

6. A liquid treating apparatus, including a treating chamber, a settling chamber arranged above said treating chamber and communicating therewith, means for withdrawing liquid from said settling chamber and for discharging the same in the form of high velocity jets into said treating chamber to produce violent agitation therein, a series of baffles between said treating and settling chambers and arranged to oppose movement of liquid caused by agitation without interfering with the free flow of liquid from said treating chamber to said settling chamber, means for supplying liquid and material to be treated to said treating chamber, and means for removing treated liquid from said settling chamber.

7. A liquid treating apparatus, including a treating chamber, a settling chamber arranged above said treating chamber and communicating therewith, means for withdrawing liquid from said settling chamber and for discharging the same in the form of high velocity jets into said treating chamber to produce violent agitation therein, baffles between said treating and settling chambers and extending transversely of the direction of motion produced by said jets to prevent transmission of said motion to the liquid in said settling chamber, a duct extending through said settling chamber toward said treating chamber for supplying liquid and material to said treating chamber, and means for withdrawing treated liquid from said settling chamber.

8. A dissolving apparatus including a lower dissolving chamber, discharge nozzles arranged to deliver high velocity jets of liquid tangentially into said chamber, a settling chamber above said dissolving chamber, a neck portion of reduced diameter connecting said settling and dissolving chambers and shaped to guide material settling in said settling chamber into said dissolving chamber, means in said neck to prevent whirling of liquid therein, means for withdrawing liquid from said settling chamber intermediate of the upper and lower ends thereof for delivery to said nozzles and means for withdrawing solution from the upper part of said settling chamber.

9. A process of treating a substance with a body of liquid divided into two directly connecting portions arranged one above the other, which includes subjecting the substance and liquid in one portion of said body to violent agitation, passing the liquid from said violently agitated portion to said other portion and checking the agitation of that portion of the liquid which is flowing from one portion to the other, while the same is in transit, to maintain the liquid in such other portion free from agitation, separating by gravity at least a part of the substance from the liquid in said other portion of the body, and returning by gravity to the agitated portion of the liquid the substance separated in said other portion of the body of liquid.

10. A method of treating solid materials with a body of liquid divided into two directly connecting portions, which includes producing a whirling motion of liquid and solid material in one of said portions by the action of jets of the same kind of liquid, passing liquid from said first portion containng said jets to the other or quiescent portion in the direction of the axis of the whirling of the liquid in said first portion, checking the whirling of the liquid in transit from one portion to the other, withdrawing liquid from the quiescent portion and discharging the same in the form of the aforementioned jets into said first portion, and returning by gravity the solid material separated from the liquid in said quiescent portion to said first portion.

11. A method of treating solid material with a body of liquid divided into two connecting portions arranged one above the other, which includes subjecting a mixture of liquid and solid material in one of said portions to centrifugal action by tangential jets of the same kind of liquid, slowly passing liquid from said portion at a distance from the peripheral zone thereof into said other portion, stopping the centrifugal action of the liquid in transit from one portion to the other, pumping liquid from said other portion and discharging the same into said first mentioned portion in the form of said jets, and allowing the material to separate from the liquid in said other portion and returning the same by gravity and by the centrifugal action to the zone of action of said jets.

12. A method of making solutions of a solid material in a column of liquid, including violently agitating the solid material and liquid in the bottom of said column, passing liquid from a part of the lower portion of said column located at a distance from the peripheral portion thereof to the upper portion thereof, checking agitation of that portion of the liquid in transit from the lower to the upper portion of said column without interrupting said transit, permitting solid material to settle out of the liquid in the upper portion of said column and pass into the lower portion thereof, and continuously withdrawing liquid from the upper portion of the column and introducing liquid to the lower portion thereof.

13. A method of making solutions of solid materials in liquids, which includes subjecting a mixture of liquid and solid material in one end of a column of liquid to a whirling action by tangential jets of liquid, permitting solid material to separate from said liquid in another portion of the column, returning the solid material to said end of said column, passing liquid from said end of said column at a distance from the peripheral part thereof to said other portion, and stopping the whirling action of liquid in transit from said end of said column to the other portion of said column.

14. A continuous method of treating solid material with an upright column of liquid divided into two communicating portions arranged one above the other including violent whirling liquid and solid material to be treated in one of said portions about a substantially vertical axis, passing liquid from said one portion, from a part thereof at a distance from its periphery, to the other portion of said liquid, stopping the whirling motion of liquid in transit from said one portion to said other portion of said liquid, continuously withdrawing treated liquid from the end of said other portion remote from said first mentioned portion, and supplying fresh material and liquid to be treated to said first mentioned portion.

15. A continuous method of making solutions of solid materials in liquids, which includes dividing the liquid into two communicating portions one arranged above the other, subjecting the liquid and solid material to be treated in the lower portion to violent whirling about a substantially vertical axis, passing liquid from a part of the lower portion, adjacent to the axis of rotation of the liquid therein, to the upper portion, stopping the whirling motion of liquid in transit from the lower portion to the upper portion of the liquid, withdrawing liquid from said upper portion at a distance below the liquid level therein and returning the same to said lower portion of said body of liquid, withdrawing solution from said upper portion near the liquid level therein, and supplying additional liquid and solid material to be treated to said lower portion.

16. A liquid treating apparatus, including treating and separating chambers connected by a passage through which liquid may flow from the treating to the separating chamber, and through which material separating from the liquid in the separating chamber may pass into the treating chamber, means for violently agitating the liquid and material in said treating chamber by inducing rapid movement of the liquid in the treating chamber in a plane substantially at a right angle to the direction of movement of the liquid from the treating chamber to the separating chamber, means arranged in said passage and extending substantially parallel to the direction of flow of liquid through the same and transversely of the direction of movement of liquid in the treating chamber for checking the transmission of agitation from the treating chamber to the separating chamber without interrupting flow from one chamber to another, and means for discharging from said separating chamber the liquid farthest removed from said treating chamber.

17. A liquid treating apparatus, including a treating chamber, means for subjecting another material to the action of liquid in said treating chamber by agitation in a portion of said treating chamber, a settling chamber above said treating chamber and connected thereto by a neck portion shaped to guide parts of said other material settled out in said settling chamber into another portion of said treating chamber, baffles in said neck portion opposed to the direction of movement of liquid by agitation in said dissolving chamber, said baffles providing between them ample space through which liquid can flow from said treating to said settling chamber, and means for circulating liquid from said settling chamber to said dissolving chamber.

18. A process of treating a substance with a body of liquid divided into two portions connected by a neck of liquid of materially less cross sectional area than said portions, which includes subjecting the substance and liquid in one portion of said body to violent agitation, passing the liquid through said neck from said violently agitated portion to such other portion and checking the agitation of that portion of the liquid which is in transit from one portion to the other without interrupting said transit to maintain the liquid in such other portion free from agitation, and separating by gravity at least a part of the substance from the liquid in said other portion of the body.

19. An apparatus for dissolving solid material in a liquid, including a dissolving chamber and a separating chamber arranged one above the other, said dissolving chamber being of substantially circular cross section, discharge nozzles arranged to deliver high velocity jets of liquid substantially tangentially into said dissolving chamber to produce in said dissolving chamber a whirling motion of the liquid and material to be dissolved, a neck portion forming a connecting passage between said chamber and of materially less diameter than said dissolving chamber and arranged substantially co-axially with said dissolving chamber to prevent the materials in the peripheral portions of said dissolving chamber from passing into said neck portion, and means for withdrawing liquid from said separating chamber and for discharging the same into said dissolving chamber through said nozzles.

20. An apparatus for dissolving solid material in a liquid, including a dissolving chamber and a separating chamber arranged one above the other, said dissolving chamber being of substantially circular cross section, discharge nozzles arranged to deliver high velocity jets of liquid substantially tangentially into said dissolving chamber to produce in said dissolving chamber a whirling motion of the liquid and material to be dissolved, a neck portion forming a connecting passage between said chambers and of materially less diameter than said dissolving chamber and arranged substantially coaxially with said chambers, said separating chamber having tapering walls converging toward said neck for guiding material separated from the liquid in said separating chamber to said neck, liquid discharge means for withdrawing clear liquid from a part of said separating chamber farthest removed from the dissolving chamber, and liquid discharge means located at a portion of said separating chamber intermediate of said dissolving chamber and said first mentioned liquid discharge means for withdrawing liquid from which solid material has not fully separated and for discharging the same into said dissolving chamber through said nozzles.

EDWIN COWLES.